UNITED STATES PATENT OFFICE.

PASCAL MARINO, OF LONDON, ENGLAND.

PROCESS FOR RENDERING CELLULOID UNINFLAMMABLE AND INCOMBUSTIBLE.

No. 893,634.      Specification of Letters Patent.      Patented July 21, 1908.

Application filed April 18, 1907. Serial No. 368,988.

*To all whom it may concern:*

Be it known that I, PASCAL MARINO, chemist, a subject of the King of Italy, and residing at 6 Featherstone Buildings, High Holborn, W. C., in the county of London, England, have invented an Improved Process for Rendering Celluloid Uninflammable and Incombustible, of which the following is a specification.

This invention relates to a process having for its object to render celluloid uninflammable and incombustible while at the same time preserving the transparency, strength, and elasticity of ordinary celluloid. For this purpose ordinary celluloid that is cellulose compounded with camphor or its equivalent is dissolved in a closed vessel by means of suitable solvents, such as acetone, methyl-alcohol, acetic acid mixed with acetic anhydrid and absolute alcohol, alcoholic ether, ethyl acetate, or amyl acetate. This solution of celluloid must have a certain degree of density, not too dilute nor too viscous. If it is too dilute it will become concentrated when exposed for some time to the open air, while if it is too thick a small quantity of solvent used may be added. The following liquid is then separately made up to be added afterwards to the solution of celluloid thus obtained.

One or more mineral salts, not soluble either in cold water, boiling water or alcohol (but which are soluble in acetic acid with or without an admixture of acetic anhydrid) is or are dissolved in sufficient acetic acid, with or without acetic anhydrid to produce the solution of the salt or salts taken. This solution is then filtered. The proportion of the salt, or salts, used should be from two to three parts by weight of salt, or salts, to from ten to fifteen parts by weight of dissolved celluloid or thereabouts.

The above mentioned mineral salts not soluble either in cold water or in boiling water or alcohol, but which are soluble in acetic acid and acetic anhydrid, are twenty-four in number and are well known but for the sake of convenience they may be specified as follows:—(1) Aluminium hydroxid. (2) Aluminium iodid. (3) Barium chromate. (4) Barium dibasic phosphate. (5) Barium tribasic phosphate. (6) Barium pyrophosphate. (7) Calcium arsenate. (8) Calcium arsenite. (9) Calcium basic phosphate. (10) Calcium tribasic phosphate (non acid). (11) Chromium oxid. (12) Cobalt phosphate. (13) Iron phosphate (ferric.) (14) Iron phosphate (ferrous.) (15) Iron pyrophosphate (ferric.) (16) Lead fluorid. (17) Lead nitrite basic. (18) Magnesium pyrophosphate. (19) Nickel phosphate. (20) Silver arsenate. (21) Silver phosphate. (22) Silver pyrophosphate. (23) Sodium periodate. (24) Stannic acid.

The choice of the salts must be made with discrimination according to whether it is desired to make the uninflammable celluloid transparent or shaded in very delicate tints. It should be remarked in this connection that aluminium hydroxid, barium phosphate, calcium phosphate and magnesium pyrophosphate, give no shade to the non-inflammable celluloid which consequently remains as transparent as ordinary celluloid, but by using barium chromate, or chromium oxid a tint can be obtained varying from straw yellow to the shade of maize. Tints and shades possessing the brilliancy of mother-of-pearl are obtained by a suitable mixture of nickel phosphate, cobalt phosphate, ferric and ferrous phosphates, stannic acid and lead fluorid, and lead nitrite basic. To the said solution of salt or salts is afterwards added carbon tetrachlorid, which is a colorless liquid insoluble in water but soluble in alcohol and ether. This liquid may be replaced by carbon tetrabromid, but the latter is objectionable commercially owing to its high price. The proportion of the carbon tetrachlorid used should be from three to five parts by weight of the same to one hundred parts by weight of dissolved celluloid or thereabouts. There is also afterwards added to the aforesaid mixture some chloro picrin known under the name of trichlor-nitromethane $C(NO_2)Cl_3$, which is a colorless non-combustible liquid, and some cyanogen $(C_2N_2)$ which is also uninflammable, and insoluble in water but soluble in alcohol and ether. The proportions preferably used being from 3 to 5 parts by weight of each to 100 parts by weight of dissolved celluloid or thereabouts. The whole mixture as above described is now added to the dissolved celluloid in the closed vessel and is thoroughly mixed and exposed for from ten to twelve hours in the said closed vessel to the action of the ingredients and their vapors. After this process there is finally added a small quantity of formaldehyde solution the whole mixture being thoroughly stirred in the closed vessel, and the celluloid is then again exposed to the action of the vapors of the formaldehyde, which are not inflammable, for from eight to ten hours. Owing to the action of the solution of formaldehyde, the formaldehyde which is of the methylic series combines all the molecules of the celluloid in solution and makes one body. The water which is in the formaldehyde is absolutely refractory and does not combine with the celluloid thus the celluloid agglomerates in one piece and floats in the aqueous liquid. The celluloid agglomerates or gathers together so as to form a compact mass floating upon the liquid. The whole of this liquid is then drawn off, and the remaining celluloid paste is dried, rolled, and molded to the required shape.

Thus by means of my invention I provide a noninflammable celluloid having all the qualities of ordinary celluloid, and particularly with regard to its strength, transparency, and elasticity.

The whole of the liquid drawn off from the celluloid paste may be used again if desired for the final solution.

Having now fully described the nature of my said invention, what I claim and desire to secure by Letters Patent is:—

A process for rendering celluloid uninflammable and incombustible consisting in dissolving the celluloid by any suitable solvent, such as those herein described, adding to the dissolved celluloid one or more mineral salts (insoluble in cold or hot water or alcohol, but soluble in acetic acid or acetic anhydrid) the said salt or salts being dissolved in acetic acid or acetic anhydrid or a mixture of both, afterwards adding carbon tetrachlorid, or carbon tetrabromid and again adding trichlor-nitro-methane $C(NO_2)Cl_3$, and cyanogen $(C_2N_2)$, thoroughly mixing and exposing the admixture in a closed vessel to the action of the ingredients and their vapors for from twenty to twentyfour hours, again adding to the compound formaldehyde solution, thoroughly mixing and again exposing the said mixture or compound in the closed vessel for a further period of from eight to ten hours and finally drawing off the liquid from the resulting compact mass of celluloid and drying the latter which may then be rolled or molded as desired all substantially as described and in or about the proportions named.

In witness whereof I have hereunto set my hand in the presence of two witnesses.

PASCAL MARINO.

Witnesses:
  FREDERICK MICAH MELLOR,
  JOHN JAMES RAWLEY.